United States Patent
Kotak et al.

(10) Patent No.: US 12,202,378 B2
(45) Date of Patent: Jan. 21, 2025

(54) TRACTION BATTERY ASSEMBLY HAVING BATTERY ARRAY THAT IS RECONFIGURABLE TO HAVE DIFFERENT NUMBERS OF BATTERY CELLS IN PARALLEL WITH EACH OTHER

(71) Applicant: Ford Global Technologies, LLC, Dearborn, MI (US)

(72) Inventors: Nihar Kotak, Farmington Hills, MI (US); Daniel Paul Roberts, Livonia, MI (US); Francisco Fernandez-Galindo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 847 days.

(21) Appl. No.: 17/384,898

(22) Filed: Jul. 26, 2021

(65) Prior Publication Data
US 2023/0024486 A1    Jan. 26, 2023

(51) Int. Cl.
| | |
|---|---|
| *H01M 50/105* | (2021.01) |
| *B60K 1/04* | (2019.01) |
| *B60L 58/19* | (2019.01) |
| *H01M 50/211* | (2021.01) |
| *H01M 50/507* | (2021.01) |
| *H01M 50/553* | (2021.01) |
| *H02J 7/00* | (2006.01) |

(52) U.S. Cl.
CPC ............ *B60L 58/19* (2019.02); *B60K 1/04* (2013.01); *H01M 50/105* (2021.01); *H01M 50/211* (2021.01); *H01M 50/507* (2021.01); *H01M 50/553* (2021.01); *H02J 7/0024* (2013.01); *H02J 7/0047* (2013.01)

(58) Field of Classification Search
CPC ............ H01M 50/105; H01M 50/211; H01M 50/507; H01M 50/553
See application file for complete search history.

(56) References Cited

U.S. PATENT DOCUMENTS

| | | | |
|---|---|---|---|
| 10,770,908 B2 | 9/2020 | Verbridge | |
| 10,974,617 B2 | 4/2021 | Hiroe et al. | |
| 2016/0133906 A1* | 5/2016 | Kedir | H01M 50/516 |
| | | | 429/90 |
| 2019/0229542 A1* | 7/2019 | Dunn | H01M 16/006 |

FOREIGN PATENT DOCUMENTS

| | | |
|---|---|---|
| CN | 110014880 A | 7/2019 |
| CN | 110303944 A | 10/2019 |
| JP | 2008278635 A | 11/2008 |

* cited by examiner

*Primary Examiner* — Jane J Rhee
(74) *Attorney, Agent, or Firm* — David B. Kelley; Carlson, Gaskey & Olds, P.C.

(57) ABSTRACT

A traction battery assembly includes battery cells of a battery array, and switches of the battery array. The switches are transitionable between a first configuration and a second configuration. When the switches are in the first configuration, the battery cells of the array are partitioned into a first number of groups of battery cells in parallel with each other. When the switches are in the second configuration, the battery cells of the array are partitioned into a different, second number of groups of battery cells in parallel with each other.

19 Claims, 3 Drawing Sheets

TRACTION BATTERY ASSEMBLY HAVING BATTERY ARRAY THAT IS RECONFIGURABLE TO HAVE DIFFERENT NUMBERS OF BATTERY CELLS IN PARALLEL WITH EACH OTHER

TECHNICAL FIELD

This disclosure relates generally to a battery array within a traction battery pack of an electrified vehicle and, more particularly, to reconfiguring the battery array to have different numbers of battery cells in parallel with each other.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle can include a plurality of arrays. Each array includes a plurality of individual battery cells. Some battery packs includes switches that can be transitioned to connect different battery arrays in parallel or series with each other.

SUMMARY

A traction battery assembly according to an exemplary aspect of the present disclosure includes, among other things, battery cells of a battery array, and switches of the battery array. The switches are transitionable between a first configuration and a second configuration. When the switches are in the first configuration, the battery cells of the array are partitioned into a first number of groups of battery cells in parallel with each other. When the switches are in the second configuration, the battery cells of the array are partitioned into a different, second number of groups of battery cells in parallel with each other.

In another exemplary embodiment of the foregoing traction battery assembly, each group within the first number of groups includes a first number of battery cells in parallel with each other, and each group within the second number of groups includes a second, different number of battery cells in parallel with each other.

In another exemplary embodiment of any of the foregoing traction battery assemblies, at least two of the switches are changed from a first state to a different, second state when the switches are transitioned from the first configuration to the second configuration.

In another exemplary embodiment of any of the foregoing traction battery assemblies, each group within the first number of groups includes two battery cells in parallel, and each group within the second number of groups includes four battery cells in parallel.

In another exemplary embodiment of any of the foregoing traction battery assemblies, the battery cells are disposed along a common axis.

In another exemplary embodiment of any of the foregoing traction battery assemblies, the battery array is a first battery array and the battery cells are first battery cells disposed along a first axis. The assembly further includes a second battery array including a second plurality of battery cells. The second battery array is disposed along a second axis that is spaced a distance from the first axis.

A traction battery assembly according to yet another exemplary embodiment of the present disclosure includes battery array terminals of the battery array and battery cell terminals of each of the battery cells. The switches are operably between the battery array terminals and at least one of the battery cell terminals.

Another exemplary embodiment of any of the foregoing traction battery assemblies includes a busbar system operably connecting the battery array terminals to the busbar cell terminals. Current flows along a first path through the busbar system when the switches are in the first configuration. Current flows along a different, second path through the busbar system when the switches are in the different, second configuration.

In another exemplary embodiment of any of the foregoing traction battery assemblies, the battery cells are pouch cells.

In another exemplary embodiment of any of the foregoing traction battery assemblies, the battery cell terminals are terminal tabs.

A traction battery array configuration method according to another exemplary aspect of the present disclosure includes, among other things, transitioning switches between the first configuration and a second configuration to change a path that current flows between battery cell terminals within a battery array and battery array terminals of the battery array. When the switches are in the first configuration, the battery cells are partitioned into a first number of groups of battery cells in parallel with each other. When the switches are in the second configuration, the battery cells are partitioned into a different, second number of groups of battery cells in parallel with each other.

In another exemplary embodiment of the foregoing method, the transitioning between the first configuration and the second configuration includes transitioning both a first and a second switch of the switches.

In another exemplary embodiment of any of the foregoing methods, each group within the first number of groups includes a first number of battery cells in parallel with each other, and each group within the second number of groups includes a second, different number of battery cells in parallel with each.

In another exemplary embodiment of any of the foregoing methods, at least two of the switches in the first configuration are changed from a first state to a different, second state when the switches are changed from the first configuration to the second configuration.

In another exemplary embodiment of any of the foregoing methods, each group within the first number of groups includes two battery cells in parallel, and each group within the second number of groups includes four battery cells in parallel.

In another exemplary embodiment of any of the foregoing methods, the battery cells are disposed along an axis.

In another exemplary embodiment of any of the foregoing methods, current flows along a first path through a busbar system between the battery cell terminals and the battery array terminals when the switches are in the first configuration. Current flows along a different, second path through the busbar system between the battery cell terminals and the battery array terminals when the switches are in the different, second configuration.

In another exemplary embodiment of any of the foregoing methods, the battery cell terminals are tab terminals that are directly connected to the busbar system.

In another exemplary embodiment of any of the foregoing methods, the battery array is a first battery array and the battery cells are first battery cells disposed along a first axis. The method further includes a second battery array including second battery cells disposed along a second axis that is spaced a distance from the first axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward changing a number of battery cells of a battery array that are in parallel with each other. The changing can occur in response to a command from a user, or can occur automatically. Changing the number of battery cells that are in parallel with each other can facilitate charging the battery cells of the battery array, for example. Changing the number of battery cells that are in parallel with each other provides more refined control than changing a number of battery arrays that are in parallel with each other.

To change the number of battery cells that are in parallel with each other, the battery array includes switches that are operably between battery cell terminals of the battery array and battery array terminals of the battery array. The switches can be transitioned between at least a first configuration and a second configuration.

In the first configuration, the battery cells are partitioned into a first number of groups of cells in parallel, say two cells in parallel. When the switches are in the second configuration, the battery cells are partitioned into a different, second number of groups of cells in parallel with each other, say four battery cells in parallel with one another.

The ability to changing the number of battery cells that are in parallel with each other can allow the battery array to be adjusted in real time. For example, grouping more battery cells of a battery array in parallel may lead to less thermal energy generation during a fast charge. Accordingly, the number of battery cells in parallel can in increased just prior to a DC fast charge.

Figure 1:
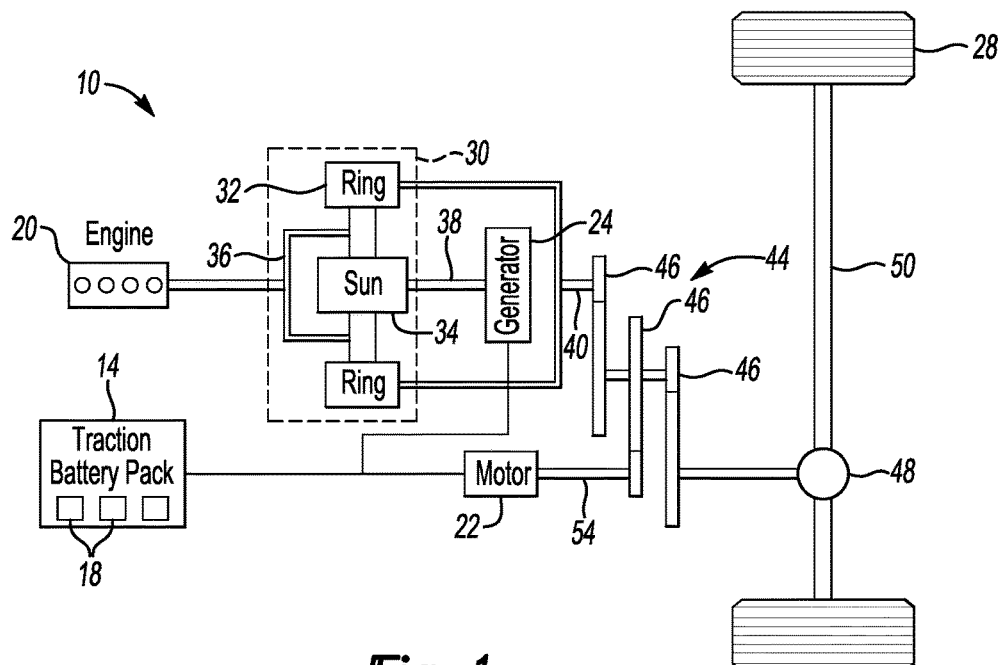
FIG. 1 illustrates a schematic view of an electrified vehicle powertrain having a traction battery pack with a plurality of battery arrays.

Referring to FIG. 1, a powertrain 10 of a plug-in hybrid electric vehicle (PHEV) includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction battery packs in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
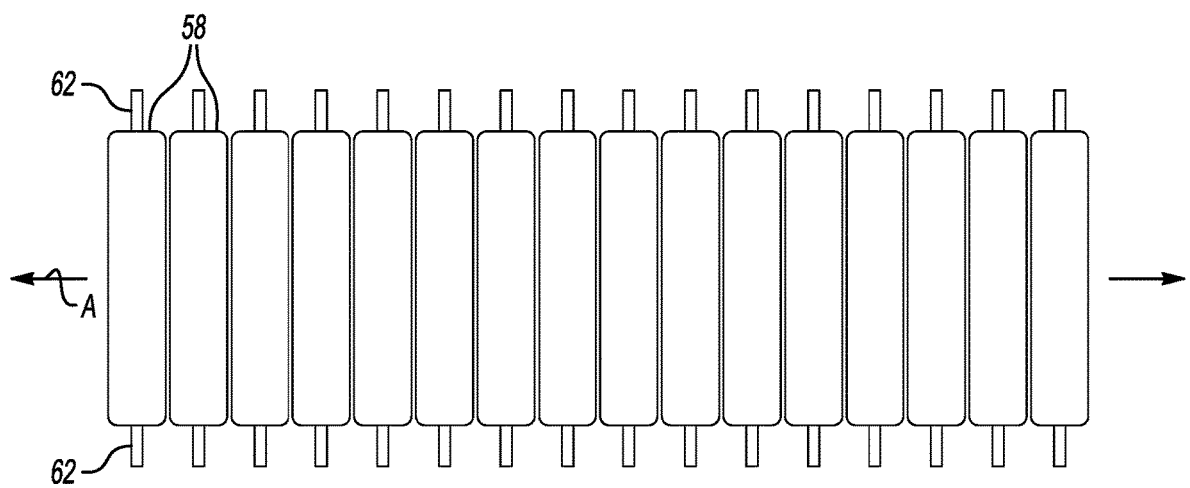
FIG. 2 illustrates a top view of a plurality of battery cells from one of the battery arrays within the traction battery pack of FIG. 1.

With reference now to FIG. 2 and continuing reference to FIG. 1, the battery arrays 18 each include a plurality of battery cells 58 disposed along an axis A. The battery arrays 18, in this example, each includes sixteen individual battery cells 58 disposed directly adjacent to one another along the axis A. While the example battery array 18 includes sixteen individual battery cells, other battery arrays could include other numbers of individual battery cells 58.

The battery pack 14 includes several individual battery arrays 18. Each of these battery arrays includes a plurality of battery cells disposed along a respective axis. The axes of the battery arrays 18 within the battery pack 14 can be spaced a distance from each other.

The example battery cells 58 are prismatic pouch cells, but other types of battery cells could be used. The battery cells 58 each include a pair of battery cell terminals 62. In this example, the battery cell terminals 62 are terminal tabs that extend from opposing lateral sides of the battery cells 58.

Figure 3:
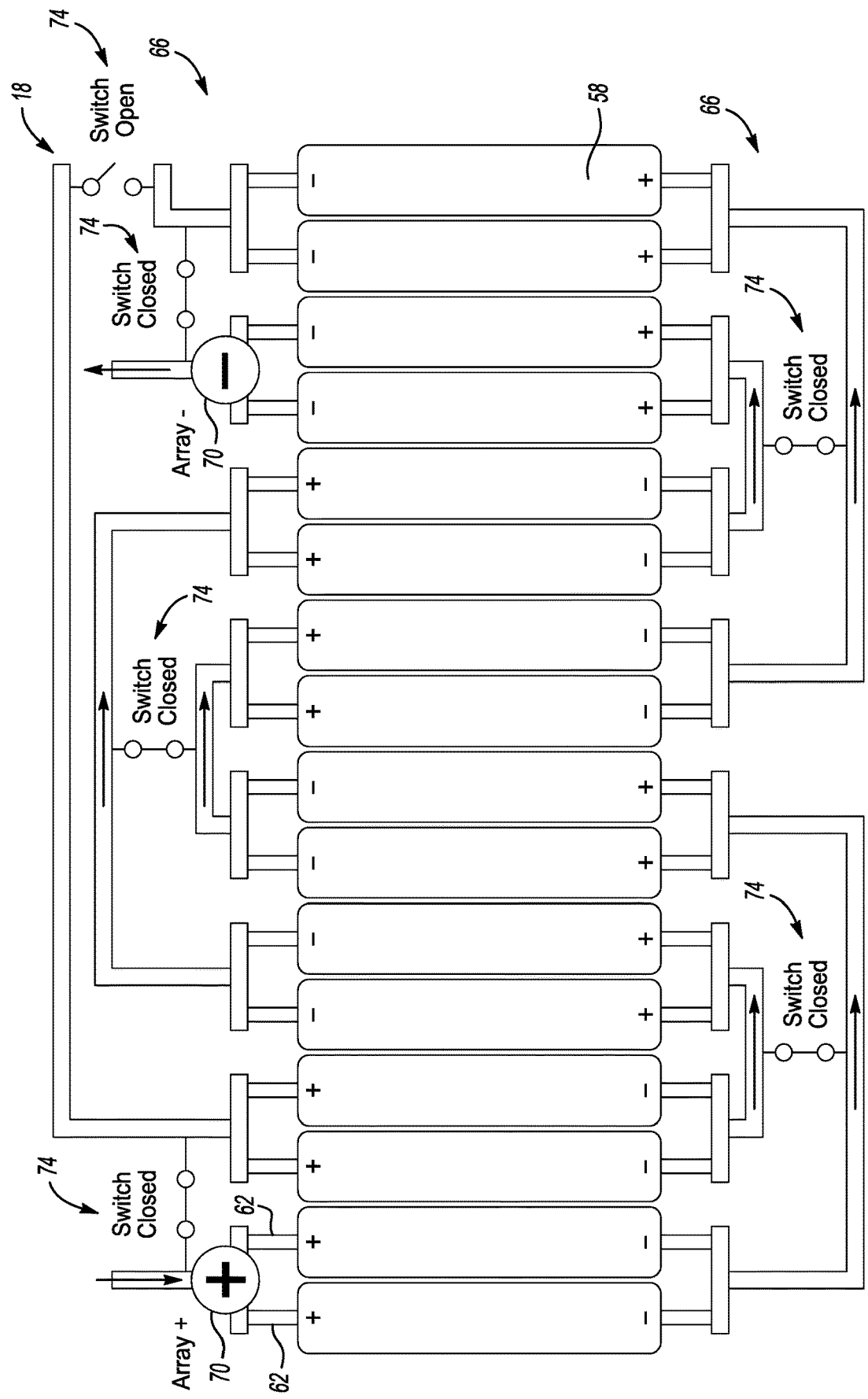
FIG. 3 illustrates battery cells of the battery array of FIG. 2 along with switches and a busbar system of the battery array. The switches are shown in a first configuration.

With reference now to FIG. 3, in addition to the battery cells 58, the battery array 18 includes a busbar system 66, battery array terminals 70, and a plurality of switches 74. The busbar system 66 electrically couples the battery cell terminals 62 to the battery array terminals 70. The battery array 18 is electrically connected to other components through the battery array terminals 70.

Figure 4:
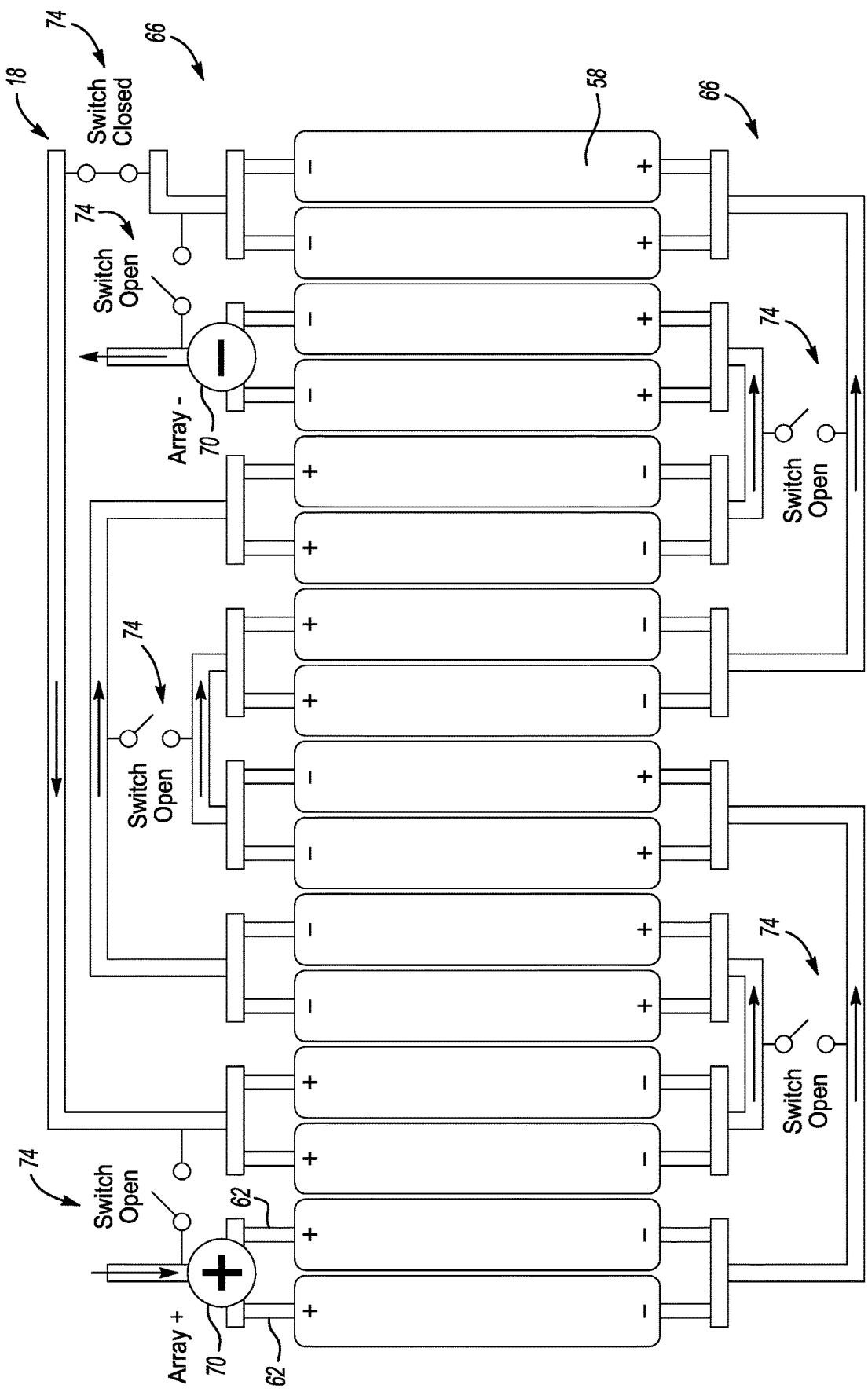
FIG. 4 illustrates the switches, busbar system, and battery cells of FIG. 3 when the switches are in a different, second configuration.

The plurality of switches 74 is utilized in connection with the busbar system 66. The plurality of switches 74 can be transitioned between at least a first configuration as shown in FIG. 3 and a second configuration as shown in FIG. 4. Changing the configuration of the switches 74 changes the electrical path through the busbar system 66 and can change the series/parallel relationship of the battery cells 58 within the battery array 18.

When the switches 74 are in the first configuration, the battery cells 58 are partitioned into a first number of groups of battery cells 58 in parallel with each other. In FIG. 3, the switches 74 are in the first configuration, which partitions the sixteen total battery cells 58 into four groups of four individual battery cells 58 connected in parallel. The four groups are connected in series. The configuration of FIG. 3 is referred to as a sixteen cell stack operably connected as a 4P4S array.

In FIG. 4, the switches 74 are in the second configuration, which partitions the sixteen total battery cells 58 into eight groups of two individual battery cells 58 connected in parallel. The eight groups are connected in series. The configuration of FIG. 4 is referred to as a sixteen cell stack operably connected as a 2P8S array.

Transitioning the switches 74 from the first configuration of FIG. 3 to the second configuration of FIG. 4 involves, in this example, changing each of the switches 74 from a first state to a second state. The switches 74 are changed back to the first state to transition the switches 74 back to the first configuration.

While this example changes all the switches 74 from a first state to a second state when transitioning the switches from the first configuration to the second configuration, other examples may transition some of the switches 74 when transitioning between the first configuration and the second configuration.

Transitioning the switches 74 from the first configuration of FIG. 3 to the second configuration of FIG. 4 changes a path that current flows between the battery cell terminals 62 and the battery array terminals 70. While two configurations are described and explained, more than two configurations are contemplated and fall within the scope of this disclosure.

The switches 74 in FIGS. 3 and 4 are represented schematically. The switches 74 could be electrical switches, mechanical switches, or some combination of these. In some examples, the switches 74 are solenoids for the switches 74. In other examples, the switches 74 are contactors.

The switches 74 can be transitioned back and forth between the first configuration and the second configuration in response to a particular use case, such as charging an electrified vehicle having the traction battery pack 14. In some examples, a user can initiate the transition of the switches 74 between the first and second configurations by issuing a command through a touch screen of a vehicle or mobile device. In another example, the transition between the first and second configurations occurs automatically in response to, for example, initiating a charge of the traction battery pack 14.

DC fast charge stations provide 800V-1000V but many vehicle systems are designed for max. 400V, which does not allow utilization of the full capability of the DC fast charge station. In particular, the DC fast charge can involve a relatively high current. This generates more thermal energy causing the system to get into power limits more quickly than a 1000V system. Once in the power limit zone, the charge power supplied to the battery pack is significantly reduced thereby increasing the charging time.

Features of some of the disclosed examples allow a user to select how many battery cells should be in parallel so that the battery cells can be adapted to a particular use case. This can lead to lower thermal energy levels and overall better control of battery component temperatures. Lowering thermal energy can reduce parasitic loads on the eAC compressor/battery pack cooling system. Selectability can enabling existing 400V systems to be used in conjunction with higher voltage rated charge stations The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
a plurality of battery cells of a battery array;
a plurality of switches of the battery array,
the plurality of switches transitionable between a first configuration and a second configuration,
wherein, when the switches are in the first configuration, the plurality of battery cells are partitioned into a first number of groups of battery cells in parallel with each other,
wherein, when the switches are in the second configuration, the plurality of battery cells are partitioned into a different, second number of groups of battery cells in parallel with each other; and
battery array terminals of the battery array and battery cell terminals of each of the battery cells within the plurality of battery cells, wherein the plurality of switches are operably between the battery array terminals and at least one of the battery cell terminals.

2. The traction battery assembly of claim 1, wherein each group within the first number of groups includes a first number of battery cells in parallel with each other, and each group within the second number of groups includes a second, different number of battery cells in parallel with each other.

3. The traction battery assembly of claim 1, wherein at least two of the switches are changed from a first state to a different, second state when the plurality of switches is transitioned from the first configuration to the second configuration.

4. The traction battery assembly of claim 1, wherein each group within the first number of groups includes two battery cells in parallel, and each group within the second number of groups includes four battery cells in parallel.

5. The traction battery assembly of claim 1, wherein the plurality of battery cells are all disposed along a common axis.

6. The traction battery assembly of claim 1, wherein the battery array is a first battery array and the plurality of battery cells is a first plurality of battery cells disposed along a first axis, and further comprising a second battery array including a second plurality of battery cells disposed along a second axis that is spaced a distance from the first axis.

7. The traction battery assembly of claim 1, further comprising a busbar system operably connecting the battery array terminals to the busbar cell terminals, wherein current flows along a first path through the busbar system when the plurality of switches are in the first configuration, wherein current flows along a different second path through the busbar system when the plurality of switches are in the different, second configuration.

8. The traction battery assembly of claim 7, wherein the plurality of battery cells are pouch cells.

9. The traction battery assembly of claim 7, wherein the battery cell terminals are terminal tabs.

10. A traction battery array configuration method, comprising:
    transitioning a plurality of switches between a first configuration and a second configuration to change a path that current flows between a plurality of battery cell terminals within a battery array and battery array terminals of the battery array,
    wherein, when the switches are in the first configuration, the plurality of battery cells are partitioned into a first number of groups of battery cells in parallel with each other,
    wherein, when the switches are in the second configuration, the plurality of battery cells are partitioned into a different, second number of groups of battery cells in parallel with each other,
    wherein current flows along a first path through a busbar system between the plurality of battery cell terminals and the battery array terminals when the plurality of switches are in the first configuration, wherein current flows along a different second path through the busbar system between the plurality of battery cell terminals and the battery array terminals when the plurality of switches are in the different, second configuration.

11. The traction battery array configuration method of claim 10, wherein the transitioning between the first configuration and the second configuration includes transitioning both a first and a second switch within the plurality of switches.

12. The traction battery array configuration method of claim 10, wherein each group within the first number of groups includes a first number of battery cells in parallel with each other, and each group within the second number of groups includes a second, different number of battery cells in parallel with each other.

13. The traction battery array configuration method of claim 10, wherein at least two of the switches in the plurality of switches are changed from a first state to a different, second state when the plurality of switches is changed from the first configuration to the second configuration.

14. The traction battery array configuration method of claim 10, wherein each group within the first number of groups includes two battery cells in parallel, and each group within the second number of groups includes four battery cells in parallel.

15. The traction battery array configuration method of claim 10, wherein the plurality of battery cells are disposed along an axis.

16. The traction battery array configuration method of claim 10, wherein the battery cell terminals are tab terminals that are directly connected to the busbar system.

17. The traction battery array configuration method of claim 10, wherein the battery array is a first battery array and the plurality of battery cells is a first plurality of battery cells disposed along a first axis, and further comprising a second battery array comprising a second plurality of battery cells disposed along a second axis that is spaced a distance from the first axis.

18. The traction battery assembly of claim 1, wherein the battery array is electrically connected to another component through the battery array terminals.

19. The traction battery array configuration method of claim 10, further comprising electrically connecting the array to another component through the battery array terminals.

* * * * *